United States Patent [19]

Burkholder et al.

[11] 4,252,206
[45] Feb. 24, 1981

[54] ADJUSTABLE BATTERY RESTRAINT

[75] Inventors: Gary F. Burkholder, North Royalton; Jay B. Stotts, Mentor; David L. Morrow, South Euclid, all of Ohio

[73] Assignee: Towmotor Corporation, Mentor, Ohio

[21] Appl. No.: 74,935

[22] Filed: Mar. 16, 1979

[51] Int. Cl.³ .............................................. B60R 18/02
[52] U.S. Cl. .................................. 180/68.5; 248/503
[58] Field of Search ...................... 180/68.5; 248/503; 292/175, 283, 302; 105/50, 51; 410/32, 41, 121, 129, 140, 141

[56] References Cited

U.S. PATENT DOCUMENTS

| 7,575 | 8/1850 | Drake | 410/32 |
|---|---|---|---|
| 427,723 | 5/1890 | Anderson | 292/283 |
| 1,315,568 | 9/1919 | Neidhammer | 292/283 |
| 2,257,155 | 9/1941 | Bowers | 180/68.5 |
| 2,453,835 | 11/1948 | Donkin | 180/68.5 |
| 2,592,956 | 4/1952 | Saber | 292/302 |
| 2,919,946 | 1/1960 | Miener | 248/503 X |
| 3,826,115 | 7/1974 | Davis | 180/68.5 X |
| 3,866,704 | 2/1975 | Bowers et al. | 180/68.5 |
| 4,013,136 | 3/1977 | Fear | 180/68.5 |
| 4,033,424 | 7/1977 | Evans | 180/68.5 |

Primary Examiner—John J. Love
Assistant Examiner—Michael Mar
Attorney, Agent, or Firm—Phillips, Moore, Weissenberger, Lempio & Majestic

[57] ABSTRACT

An adjustable apparatus (15) for rigidly restraining different sized objects (10) such as batteries which are resting on a frame (12), such as that of a lift truck vehicle (13). The apparatus has opposed first and second support members (16,17) upwardly rising from the frame. A rigid first strap structure (20) is pivotally attached (22) to the first support member, while a rigid second strap structure (29) is releasably attached (31 or 31') to the second support member. The strap structures are telescopable (49) one within the other to selectively adjust the length defined by the straps.

17 Claims, 6 Drawing Figures

ADJUSTABLE BATTERY RESTRAINT

TECHNICAL FIELD

This invention relates to an apparatus for restraining objects of different sizes, more particularly for restraining different sized batteries resting on a vehicle frame.

BACKGROUND ART

It is well known that restraint devices may be utilized to prevent or retard displacement of objects. When the object to be restrained is quite heavy, as in the case of the batteries for electrically driven vehicles such as electrically driven lift trucks, it is highly desirable due to the size and weight of the batteries that, in the event that the vehicle is tipped under disadvantageous working conditions or brought to a sudden stop, the battery be restrained and held upon the vehicle frame so that it does not lift therefrom. At the same time, it is desirable that convenient access to the battery be available for service or replacement thereof.

In electrically driven vehicles the batteries are usually supported upon a vehicle frame from which walls rise upwardly from the frame to define a battery well. Such vehicles are frequently manufactured as a family of vehicles where the primary difference between members of the family is that of battery voltage. As the battery voltage capacity increase, so also does the battery size increase. The members of the family of vehicles thus have usually been manufactured with frames of different lengths to accommodate the differently sized batteries supported thereon, and with walls defining the battery well of different spaced apart distance.

Prior battery restraining devices have been adapted to accommodate the particular sized battery to be used in the vehicles, as for example adapted to the frame length and/or the distance between the battery well walls, and such prior battery restraining devices have not been interchangeable from one battery size to another unless the battery to be exchanged is of a size only slightly different from the previous battery.

It would be highly desirable to provide a battery restraining apparatus which could be used with any member of a family of vehicles despite the variation in frame sizes. Such a restraining apparatus, by being common to the vehicle family, would reduce the cost and the amount of storage space needed for stocking.

Additionally, it is possible to expand the vehicle frame of various vehicles, for example as disclosed in pending U.S. application Ser. No. 909,414, of common assignment hereto. It is desirable that a battery restraint apparatus used in conjunction with vehicles including an expandable frame be sufficiently versatile to accommodate frame length variations and yet still provide positive battery restraint during the course of vehicle working conditions.

DISCLOSURE OF THE INVENTION

The present invention is directed to overcoming one or more of the problems set forth above.

According to the present invention, an adjustable apparatus for rigidly restraining different sized objects, such as batteries, which rest on a frame, has opposed first and second support members upwardly rising from the frame, each of which is adjacent the exterior of the object to be restrained. A first strap structure is pivotally attached to the first support member and a second strap structure is releasably attached to the second support member, both attachments at a respective strap structure first end. Means for telescoping one of a first and second straps within the other is defined by the first and second strap structures for selectively adjusting the separation between the first ends of the strap structures.

BRIEF DESCRIPTION OF DRAWINGS

FIG. 3 is a cross-sectional view taken along line III—III of FIG. 1;

BEST MODE FOR CARRYING OUT THE INVENTION

Figure 1:
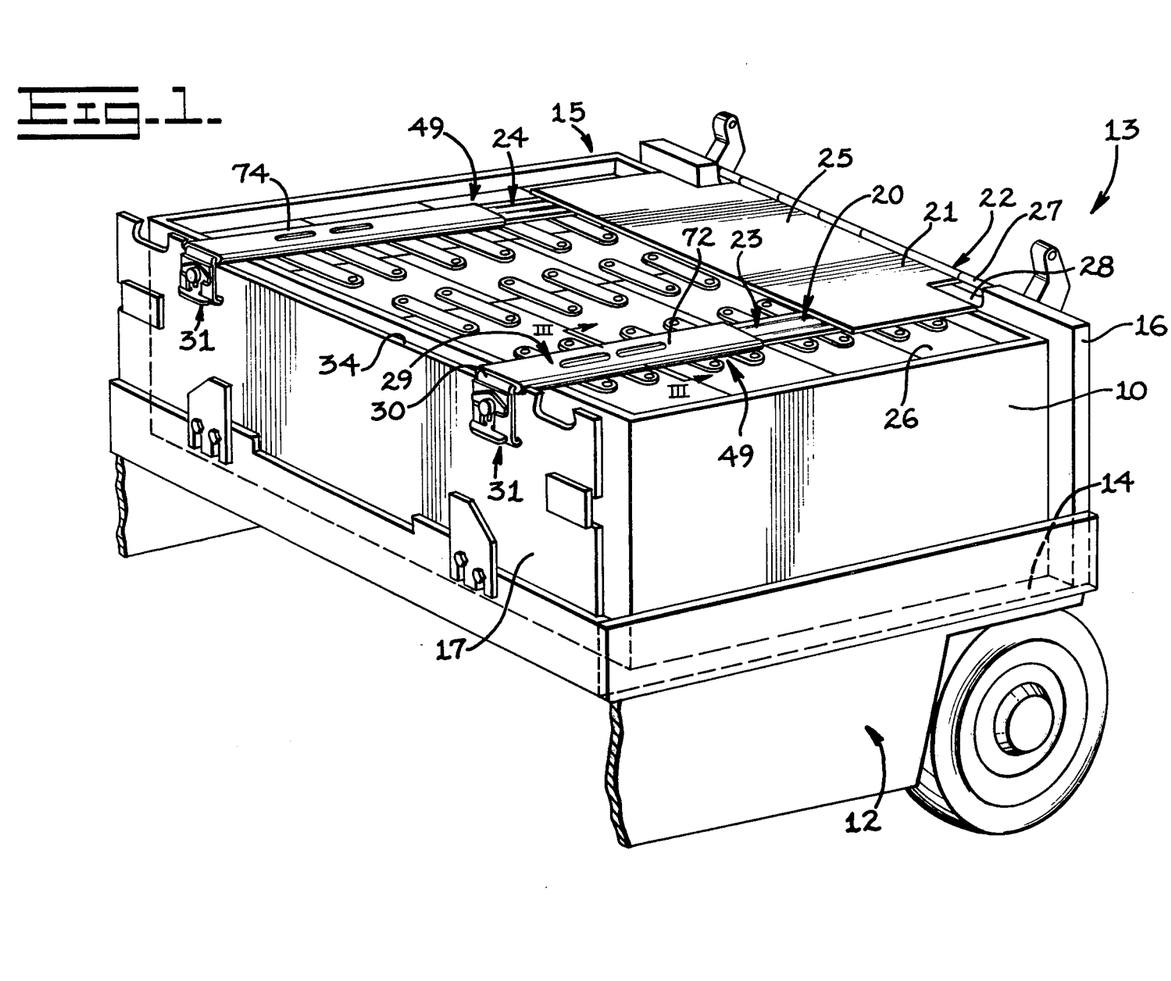
FIG. 1 is a perspective view, partially broken away, of a battery resting on a vehicle frame incorporating an embodiment of the present invention.

As shown in FIG. 1, an object 10 rests on a frame 12, partially broken away. Specifically, and as hereinafter further described, the object may be a battery 10, and the frame 12 may be included in an electrically driven vehicle 13, for example a lift truck. The frame 12 defines a well 14 in which the battery 10 sits. While the invention will be described in terms of use in such an environment, it should be understood that this is for convenience and does not limit its use to such an environment.

A restraining apparatus 15 in accordance with the present invention includes a first support member 16 and an opposed second support member 17. First and second support members 16, 17 extend vertically upwardly from the frame 12 and are located exteriorly adjacent the ends of the battery 10. Gaps 18, 19, best illustrated in FIG. 2, exist between each of the support members 16, 17 and the battery 10 as hereinafter explained.

Returning to FIG. 1, a first linearly extending strap structure 20 is attached, at a first end 21, by pivotal attachment means 22, to the first support member 16. The first strap structure 20 should be formed of a strong rigid material, for example steel. In the preferred embodiment of the invention as illustrated, the first strap structure 20 comprises a pair of straps 23 and 24 affixed as by welding or the like to a flat strap plate 25 and the pivotal attachment means 22 are supported by the plate 25.

Pivotal attachment means 22 provides for pivotal movement of the first strap structure 20 upwards and backwards away from a top 26 of battery 10 so that access to the battery 10 and initial assembly of the restraining apparatus 15 may readily be accomplished. Pivotal attachment means 22 is at a predetermined, vertically spaced distance from the frame 12. The pivotal attachment is preferably achieved where attachment means 22 comprises hinge means 27 extending adjacent a top edge 28 of first support member 16, where first support member 16 extends upwardly a distance slightly above a horizontal plane defined by battery top 26. When the first strap structure 20 is positioned for vehicle operation, hereinafter further described, the first strap structure 20 extends traverse to the first support member 16 and is slightly above the horizontal plane, substantially that defined by battery top 26.

A second, linearly extending strap structure 29 is attached at a first end 30 thereof to the second support member 17 by releasable attachment means 31. In the preferred embodiment the second strap structure 29 comprises a pair of second straps 72,74, each of which are attached to the second support member 17 by releasable attachment means 31. It should be understood that, in the broad sense, the invention is not limited to use of pairs of straps 23,24 and 72,74. For convenience, only one of each of the first and second straps will be described hereinafter. Releasable attachment means 31 is at a predetermined, vertically spaced distance from frame 12, and also functions to prevent vertical movement of the second strap structure 29 with respect to the second support member 17.

Figures 4, 5:
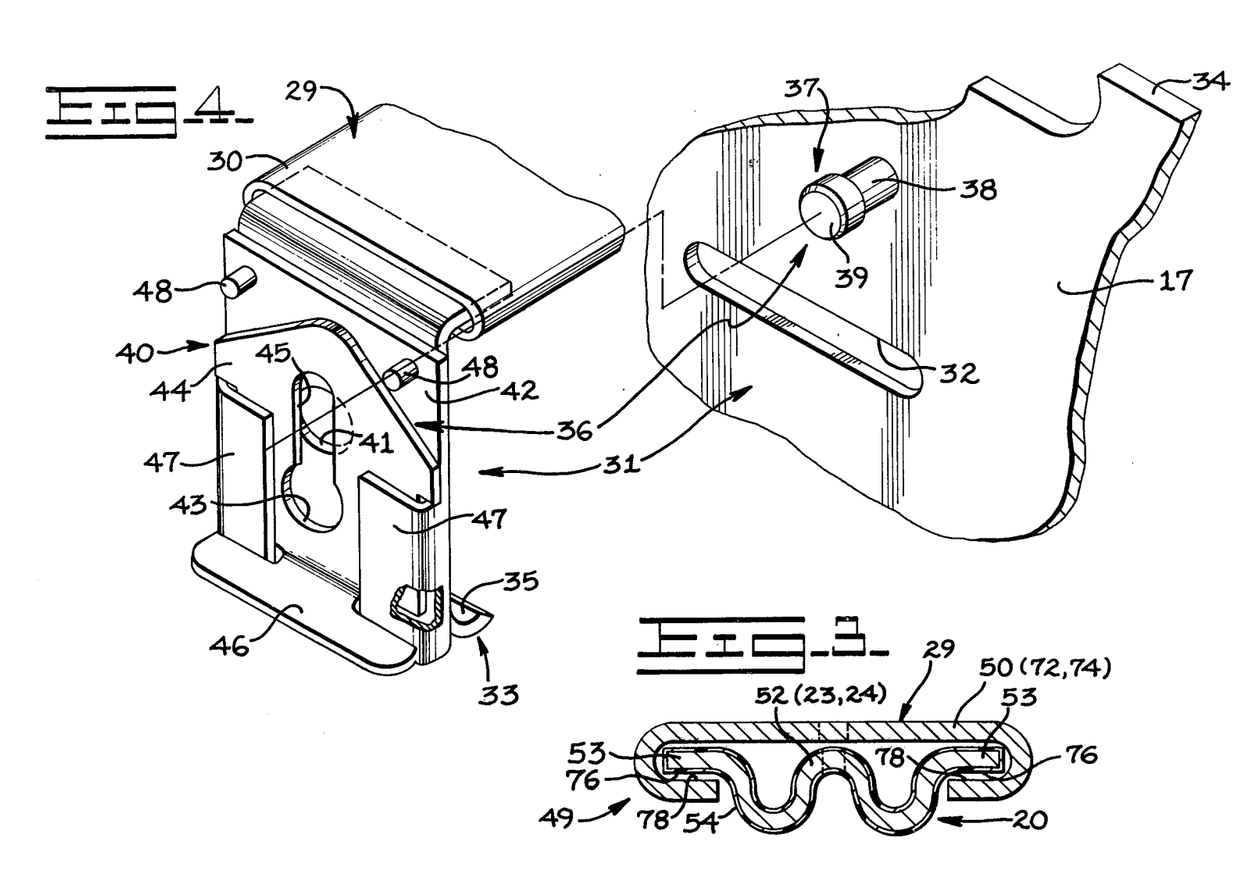
FIG. 4 is an exploded partial perspective view with portions broken away, of an embodiment for a portion of the embodiment illustrated in FIG. 1.
FIG. 5 is a top view of a detail of an apparatus in accordance with an embodiment of the present invention illustrating a preferred structure thereof.
Figure 5:
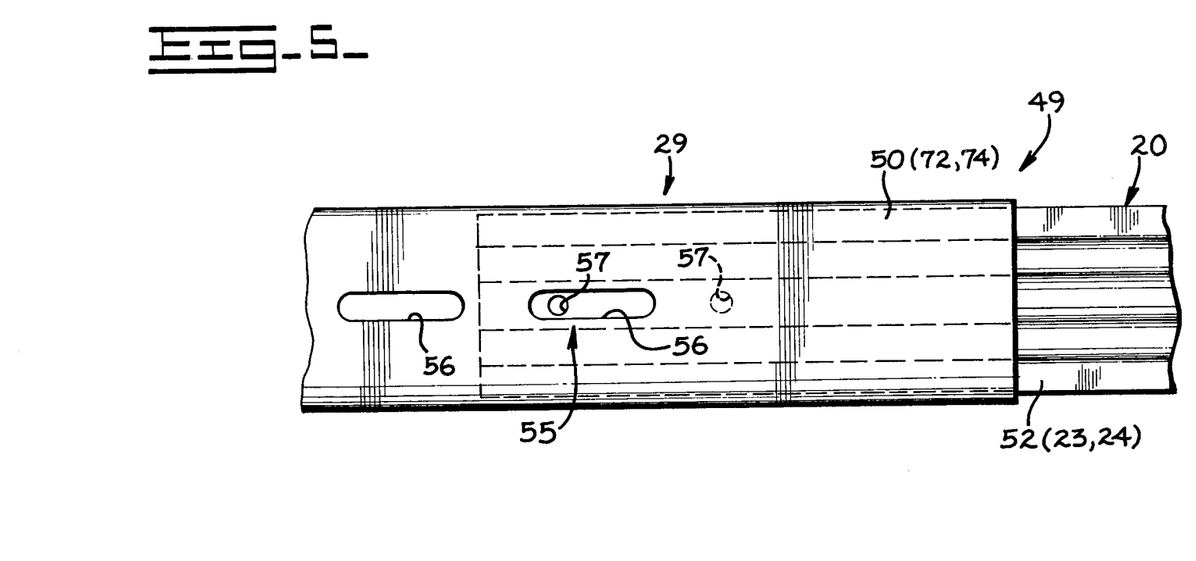

As illustrated in FIG. 4, the releasable attachment means 31 may preferably comprise a slot 32 and means 33 for engaging with the slot 32. Slot 32 is formed in second support member 17, is generally transverse to the first end 30 of the second strap structure 29, and is a spaced distance from a top edge 34 of second support member 17. The means 33 is carried by first end 30 and is formed by a "J" shaped hook member 35 which is of a shape and is positioned so as to be engageable with the slot 32.

As illustrated in FIG. 4, the releasable attachment means 31 also preferably includes releasable locking means 36 for locking the second strap structure 29 to second support member 17 and for substantially preventing horizontal movement of the second strap structure 29 relative to the second support member 17. Releasable locking means 36 comprises a pin 37 outwardly extending from second support member 17 and disposed adjacent to and above the slot 32. Pin 37 includes a shaft 38 which is rigidly secured to the second support member 17 and which terminates in a head 39 of a larger diameter than shaft 38. The locking means 36 further comprises slidable means 40 carried by the second strap structure first end 30.

Slidable means 40 includes a first aperture 41 of sufficient size to receive head 39 therethrough. The aperture 41 is defined by first end 30 usually by a first generally vertical plate 42 attached thereto for strength and rigidity. A second aperture 43 is defined by a second plate 44 which constitutes part of the slidable means 40. Also defined by second plate 44 and contiguous with the second aperture 43 is a channel 45. Apertures 41 and 43 are of sufficient size to receive head 39 therethrough whereas channel 45 is of sufficient size to receive shaft 38 therethrough, but insufficient size to permit head 39 to pass therethrough. Second plate 44 is preferably carried by first end 30 of second strap structure 29 and is slidable via pull bar 46, between a position which locks second strap structure 29, by engaging channel 45 about the shaft 38 of pin 37, against outward motion from second support member 17, and an unlocking position wherein the apertures 41 and 43 are aligned, such sliding being guided by a pair of U-shaped restraining members 47 integrally formed from the first end 30 and preferably from the first plate 42 and within which the second plate 44 is slidable. A pair of stop members 48 which outwardly extend from first end 36, are disposed above and symmetrically centered about apertures 41 and 43, and act to co-operate with second plate 44 so as to align apertures 41 and 43 for quick insertion and removal of head 39 of pin 37.

Turning to FIGS. 1 and 3, the restraining apparatus 15 of the present invention comprises telescoping means 49. The telescoping means 49 is defined by the first and second strap structures 20, 29 for slidably fitting one of the first and second strap structures 20,29 within the other thereof to selectively adjust the separation between the first ends 21,30 thereof.

Figure 2:
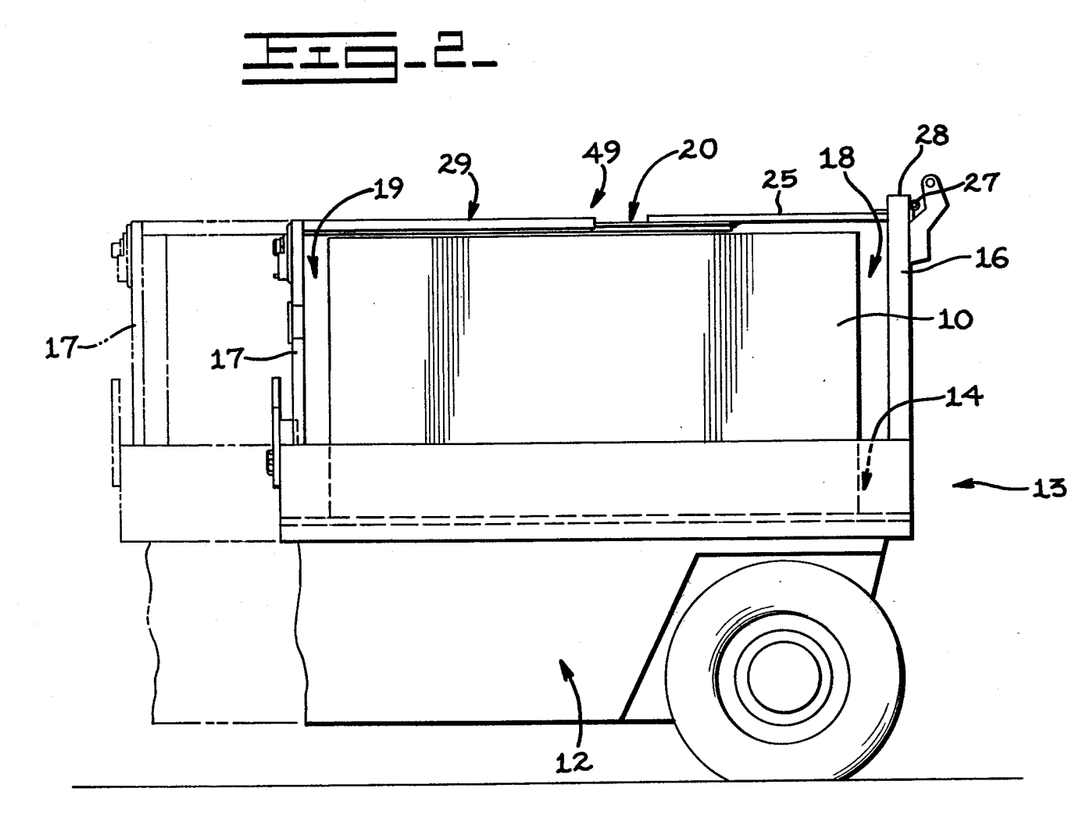
FIG. 2 is a side elevational view as in FIG. 1 and showing two different sized battery compartments.

As illustrated in FIGS. 1, 2 and 3, first and second strap structures 20,29 define the telescoping means 49 as follows: to the first end 30 of the second strap 29 is secured, at a spaced apart distance from releasable attachment means 31, as by welding or the like, telescoping member 50, which will generally simply comprise the straps 72,74; and to the first end 21 of first strap structure 20, more particularly to plate 25, is secured at a spaced apart distance from pivotal attachment means 22 as by welding or the like, an inner telescoping member 52 which will generally simply comprise the straps 23,24. Outer member 50 and inner member 52 extend longitudinally from the respective first ends towards each other. It should be understood that a reversal of parts—where inner member 52 is secured to the second strap structure 29 and outer member 50 is secured to the first strap structure 20—is within the scope of the present invention. Outer member 50 and inner member 52 should be formed of rigid very strong materials such as steel or the like.

Referring to FIG. 3, the slidable fitting of inner member 52 within outer member 50 is achieved preferably where outer member 50 is "C" shaped in cross-section, and inner member 52 is "W" shaped, or corrugated, with flanges 53 outwardly extending with respect to the longitudinal axis of the inner members 52. Flanges 53 define a downwardly facing surface 76 for slidingly engaging an upwardly facing surface 78 of outer member 50 as shown, for slidingly telescoping inner member 52 within outer member 50, and hence for permitting selective adjusting of the separation between first ends 21 and 30.

The telescopic connection of the first strap structure 20 with the second strap structure 29 allows the second strap structure 29 to move between a first position, wherein the upfacing surfaces 78 of the second strap structure 29 underlie the downwardly facing surfaces 76 of the first strap structure 20, and a second position, wherein the surfaces 76,78 are clear of each other to permit relative vertical movement.

As illustrated best by FIG. 3, the corrugation of inner member 52 is such that inner member 52 vertically extends below outer members 50 for permitting bearing engagement against the battery top 26 during abnormal operating conditions, further described below, and for increasing the strength and rigidity of inner member 52. It is preferred that inner member 52 includes a coating 54, the coating 54 comprising a corrosion resistant material such as polyvinyl chloride or the like for protection of inner member 52 against leaked battery acid. The coating 54 should also be electrically non-conductive to protect against conduction of current which could potentially shock a person touching strap structures 20,29. Coating 54 further provides smooth sliding for surfaces 76,78.

Turning to FIG. 5, telescoping means 49 may include selective securing means 55 for fastening first and second structure 20,29 together whereby they may be held together in any one of various selected lengths during assembly of the apparatus.

Selective securing means 55 may comprise a plurality of longitudinally extending slots 56 formed in outer member 50 and passing therethrough, and a plurality of bolt holes 57 tapped in inner member 52, bolt holes 57 being positioned for alignment under slots 56 as inner member 52 is slidably fitted within outer member 50. Conventional bolts (not shown) may then be inserted into bolt holes 57 for limiting telescopic sliding play of first and second strap structures 20,29 prior to and during engagement of releasable attachment means 31.

Figure 6:
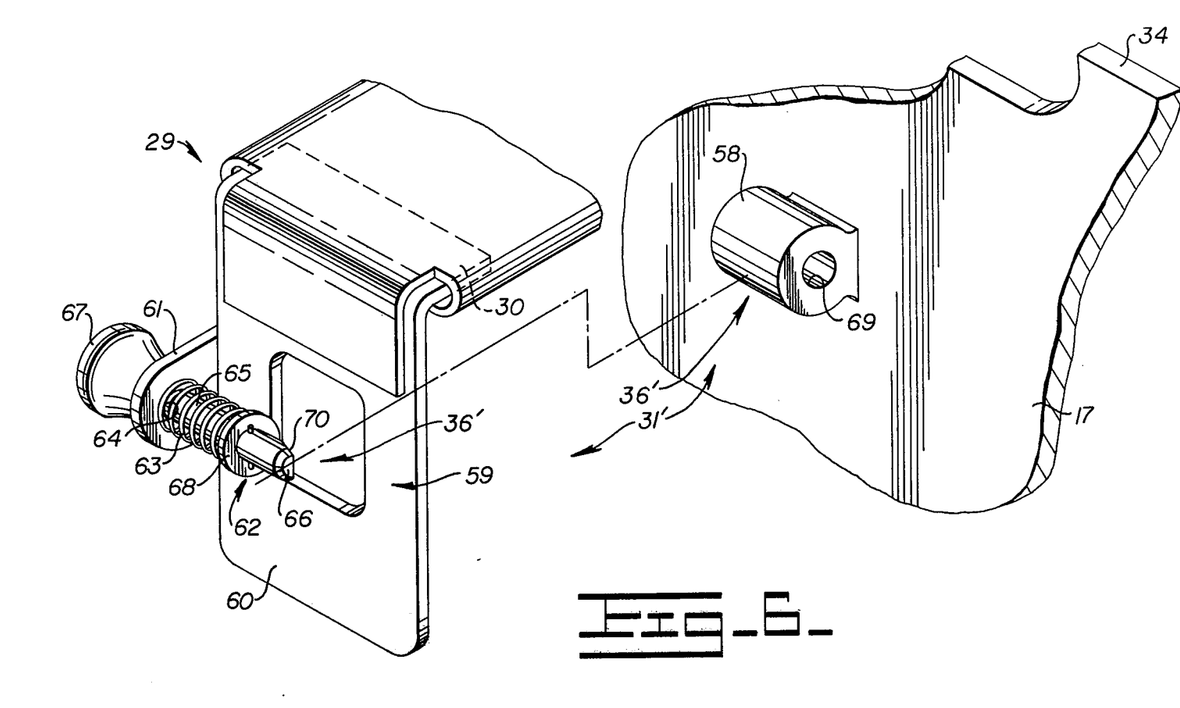
FIG. 6 is an exploded partial view, with portions broken away, of an alternate embodiment of the portion illustrated in FIG. 4.

Turning to FIG. 6, another embodiment of the means for releasable attachment, previously described as 31 in the embodiment of FIGS. 1–4, is illustrated as 31'. In this embodiment, releasable attachment means 31' comprises staple member 58 around which is adapted to be fitted means 59 for preventing vertical movement. The means 59 is secured to the first end 30 of second strap structure 29 as by welding or the like.

As illustrated in FIG. 6, the releasable attachment means 31' also preferably includes releasable locking means 36' (which is to provide the same general purpose as the previously described embodiment 36). Releasable locking means 36' comprises means 59 which includes hasp plate 60, a ring 61, a pin 62 and biasing means 63. A hole 64 passes through ring 61 which is orthogonally affixed to hasp plate 60. Hole 64 receives the pin 62, wherein pin 62 is defined by a shaft 65, a pin first end 66, and a knob 67 of larger size than hole 64, knob 67 being affixed to the pin 62 at a second end thereof. The biasing means 63, such as the helical compression spring illustrated, acts between ring 61 and an enlarged annular member 68 formed about shaft 65. The biasing means 63 thus serves to bias the first end 66 of the pin 62 into a bore 69 in staple member 58. By pulling on the knob 67, the biasing means 63 is compressed allowing insertion and/or removal of the first end 66 of the pin 62 relative to the bore 69. It is preferred that pin first end 66 be tapered along one side 70 thereof, and that bore 69 be correspondingly tapered for assisting in guiding and seating pin first end 66 in bore 69.

INDUSTRIAL APPLICABILITY

In assembly, first support member 16 will normally be fixed, such as by welding, to frame 12 (or well 14) of a vehicle 13 such as a lift truck, and first support member 16 will, as a stationary member, upwardly rise therefrom. First strap structure 20, which may be one size for interchangeable use in a family of vehicles, is assembled by pivotal attachment means 22 and may be pivotally moved backwardly to provide full access for placement of a battery 10 into the lift truck well 14 and thus upon frame 12.

The second support member 17 is normally secured (that is, made stationary) to frame 12 or well 14 by means such as bolts 84 and brackets, illustrated in FIG. 1.

Battery 10 is placed in well 14 by being lowered by means such as a crane hoist (not illustrated), since batteries for such lift trucks weight approximately 3,000 pounds. Gaps 18,19 between the battery 10 and first and second support members 16,17, best seen in FIG. 2, allow leeway for such crane hoist placement.

Second strap structure 29, which may be a common size for interchangeable use in any of a family of lift truck vehicles, may then be telescoped via outer member 50 over inner member 52 until the approximate selected distance between first ends 21 and 30 has been achieved.

When the apparatus 15 includes selective securing means 55, the person assembling the present invention may attach conventional bolts in bolt holes 57 through slots 56.

On releasably attaching of second strap structure 29 to second support member 17, the person assembling the restraint apparatus 15 would then engage hook 35 into slot 32 by pushing outer member 50 over inner member 52 into the selected distance between first ends 21,30. The slot 56, as may be observed in FIG. 6, permits this amount of limited final telescoping. The person may slide second (locking) plate 44, via bar 46 into the locking position about pin 37 (in the embodiment of releasable attachment means 31 and releasable locking means 36); or would place hasp plate 60 over staple member 58, preferably followed by releasing knob 67 which permits biasing means 63 to seat pin first end 66 in bore 69 (in the embodiment of releasable attachment means 31' and releasable locking means 36').

In operation, inner member 52 will engage battery top 26 to provide rigid, strong and secure restraint of battery 10 should the lift truck encounter abnormal operations for example, upon too fast stops or turning, and collisions, whereupon the battery 10 is subjected to forces which try to tip the battery 10; whereupon, the rigid strap structures 20,29 of the restraining apparatus 15 act to rigidly restrain the battery 10 against such tipping forces.

Other aspects, objectives, and advantages of this invention can be obtained from the study of the drawings, the disclosure and the appended claims.

We claim:

1. An adjustable apparatus (15) for rigidly restraining different sized objects (10) resting on a frame (12), the objects having at least one pair of opposed spaced apart ends, comprising:
   a first stationary support member (16) and a second relatively stationary support member (17), each of the support members (16),(17) being connected to the frame (12) at spaced apart locations on the frame (12) and adjacent respective ones of opposed spaced apart ends of an object (10) positioned between the support members (16,17), said support members (16,17) substantially vertically extending from said frame (12) to a location spaced from the frame (12);
   a first rigid elongate strap structure (20) having a first end (21);
   means (22) for pivotally attaching the first end (21) of the first strap structure to the first support member (16), the first strap structure (20) being pivotally movable about the means (22) between an object (10) overlaying position and a position spaced from overlaying the object (10);
   a second rigid elongate strap structure (29) having a first end (30);
   means (31),(31') for releasably attaching the first end (30) of the second strap structure (29) to the second support member (17) and maintaining the second strap structure (29) from movement in directions relative to the second support member (17); and
   means (49) for telescoping one of the first and second strap structures (20,29) within the other (29,20) thereof to adjust the distance between the first ends (21,30) of said strap structures (20,29).

2. An apparatus as in claim 1, further comprising:

means (36,36'), for locking and unlocking the first end of the second strap structure to the second support member, said means being of a construction sufficient for substantially preventing horizontal movement of the second strap structure relative to the support member when locked thereto.

3. An apparatus as in claim 2, wherein the releasable attaching means (31) comprises:
a slot (32) defined by the second support member and generally transverse with respect to the second strap structure; and
means (33) for selectively positionably engaging with the slot; and
means for supporting said engaging means on said second strap structure first end.

4. An apparatus as in claim 3, wherein the locking means (36) comprises:
a pin (37) carried by the second support member and outwardly extending therefrom;
means (40) for sliding between an unlocking and locking position, wherein in the locking position the sliding means is disengaged from the pin and in the locking position the sliding means is engaged with the pin; and
means for supporting said sliding means on said second strap structure first end.

5. An apparatus as in claim 2, wherein the releasable attachment means (31') comprises:
a staple member (58) carried by the second support member and outwardly extending therefrom;
means (59) for preventing vertical movement of the first end of the second strap structure with respect to the second support member; and
means for supporting said vertical movement preventing means on said second strap structure first end in engagement with said staple member.

6. An apparatus as in claim 5, wherein:
the staple member defines a bore (69); and
the vertical movement preventing means includes a pin (62) and biasing means (63) associated with the pin, the pin and biasing means outwardly extending from the vertical movement preventing means, the pin being urged into the bore by the biasing means for the locking position, and manually urgeable against the biasing means into the unlocking position.

7. An apparatus as in claim 1, wherein:
the telescoping means comprises an outer member (50) and an inner member (52), each affixed to a respective one of the first and second strap structure first end.

8. An apparatus as in claim 7, wherein the outer member is formed in a "C" shape and the inner member is corrugated.

9. An apparatus as in claim 8, wherein the inner member is formed with a corrosion resistant coating (54).

10. An apparatus as in claim 9, wherein the coating is electrically non-conductive.

11. An apparatus as in claim 1 wherein said means (49) for telescoping includes:
means (55) for holding the first and second strap structures (20,29) together and limiting telescoping movement thereof to within a predetermined range of said distance between the first ends (21,30) of said strap structures (20,29).

12. An adjustable apparatus (15) for rigidly restraining different sized batteries (10) resting on a lift truck frame (12), comprising:

a first stationary support member (16) and a spaced opposed second stationary support member (17), each of the support members adjacent ends of said battery to be restrained and rising vertically upward with respect to said frame;
a pair of first rigid, substantially longitudinally extending straps (23,24) affixed to a plate (25), the first strap having a downwardly facing surface (76);
means (22) for pivotally attaching the plate to the first support member;
a pair of second rigid, substantially longitudinally extending straps (72,74), the second straps having an upwardly facing surface (78), wherein a telescopic connection of the first straps and second straps allows the second straps to move horizontally between a first position, wherein the upwardly facing surfaces of the second straps underlie the downwardly facing surfaces of the first straps, and a second position wherein the surfaces are clear of each other to permit vertical movement of the second straps; and
means (31,31') for releasably attaching a first end (30) of each of the second straps to the second support member, and for preventing vertically upward movement of the second straps with respect to the second support member when attached thereto.

13. An apparatus as in claim 12, further comprising:
means (36,36'), for locking and unlocking the second straps to the second support member, and substantially preventing horizontal movement of the second strap relative the support member when locked thereto; and
means for supporting said locking and unlocking means on said second straps.

14. An apparatus as in claim 13, wherein the first straps are formed with a corrosion resistant coating (54).

15. The apparatus as in claim 14, wherein the coating is electrically non-conductive.

16. An adjustable apparatus (15) for rigidly restraining different sized batteries (10) on a lift truck frame (12), said battery (10) having at least one pair of opposed spaced apart ends, comprising:
a first stationary support member (16) and a second relatively stationary support member (17), each of said support members (16,17) being connected to said frame (12) at spaced apart locations on said frame (12) and adjacent respective ones of said opposed spaced apart ends of said battery (10) positioned between said support members (16,17), said first and second support members (16,17) substantially vertically extending from said frame (12);
a plate (25);
means (22) for pivotally attaching said plate to said first stationary support member (16)
a pair of first rigid elongate straps (23,24) each having a downwardly facing surface (76) and being connected to said plate;
a pair of second rigid elongate straps (72,74) each having a upwardly facing surface (78) and a first end (30), said second elongate straps (72,74) each being connected to respective ones of said first elongate straps (23,24) with said upwardly and downwardly facing surfaces (78,76) in contact with one another, said second rigid straps (72,74) being movable between extended and retracted positions; and means (31,31') for releasably attaching the first end (30) of each of the second straps (72,74) to the second support member (17) and maintaining said first (23,24) and second (72,74) straps from movement in directions relative to said second support member (17).

17. An apparatus as in claim 16 further comprising:
means (55) for holding said first and second straps (23,24 and 72,74) together and for limiting movement of said second straps (72,74) to a predetermined range between extended and retracted positions.

* * * * *